United States Patent
Bhatnagar et al.

(10) Patent No.: US 9,384,080 B2
(45) Date of Patent: Jul. 5, 2016

(54) SYNCHRONIZING PROBLEM RESOLUTION TASK STATUS USING AWARENESS OF CURRENT STATE AND TRANSACTION HISTORY

(75) Inventors: Radhika Bhatnagar, Cary, NC (US); Barnaby L. Court, Morrisville, NC (US); Michael P. Etgen, Cary, NC (US); Anjan R. Kundavaram, Durham, NC (US); Elizabeth A. Schreiber, Cary, NC (US); David B. Styles, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1066 days.

(21) Appl. No.: 12/551,737

(22) Filed: Sep. 1, 2009

(65) Prior Publication Data
US 2011/0055619 A1    Mar. 3, 2011

(51) Int. Cl.
G06F 11/00    (2006.01)
G06F 11/07    (2006.01)

(52) U.S. Cl.
CPC ........ G06F 11/0793 (2013.01); G06F 11/0709 (2013.01)

(58) Field of Classification Search
CPC ............ G06F 11/0775; G06F 11/0784; G06F 11/0793
USPC ........... 714/26, 35, 38.1, 38.14, 2, 25, 46, 57; 717/124, 127, 128
See application file for complete search history.

(56) References Cited

U.S. PATENT DOCUMENTS

| | | | |
|---|---|---|---|
| 5,243,689 A * | 9/1993 | Yoshiura et al. | 706/12 |
| 5,528,516 A | 6/1996 | Yemini et al. | |
| 6,393,386 B1 | 5/2002 | Zager et al. | |
| 6,944,849 B1 * | 9/2005 | Glerum et al. | 717/127 |
| 7,010,593 B2 | 3/2006 | Raymond | |
| 7,239,979 B1 * | 7/2007 | McComber et al. | 702/185 |
| 7,257,735 B2 * | 8/2007 | Arend | 714/26 |
| 7,293,201 B2 * | 11/2007 | Ansari | 714/38.14 |
| 7,430,495 B1 | 9/2008 | Govindan et al. | |
| 7,979,747 B2 * | 7/2011 | Bhatnagar et al. | 714/26 |
| 2004/0049372 A1 | 3/2004 | Keller | |
| 2004/0068677 A1 | 4/2004 | Briskey et al. | |
| 2004/0078683 A1 | 4/2004 | Buia et al. | |
| 2005/0172306 A1 | 8/2005 | Agarwal et al. | |
| 2005/0278273 A1 | 12/2005 | Uthe | |
| 2007/0220348 A1 | 9/2007 | Mendoza et al. | |
| 2008/0082476 A1 | 4/2008 | Mourra et al. | |
| 2008/0155336 A1 | 6/2008 | Joshi et al. | |
| 2009/0210745 A1 | 8/2009 | Becker et al. | |

* cited by examiner

Primary Examiner — Joseph Kudirka
(74) Attorney, Agent, or Firm — Patterson + Sheridan, LLP

(57) ABSTRACT

Systems, methods and articles of manufacture are disclosed for synchronizing a transaction profile with a resolution status of a problem experienced by an application. The problem may be detected for the application. A transaction profile may be retrieved for the detected problem. The transaction profile may include a sequence of transactions to be performed on the system to remedy the open problem. Transactions occurring on the system may be monitored, and an instance of the transaction profile may be updated accordingly to create a synchronized transaction profile.

21 Claims, 8 Drawing Sheets

SYNCHRONIZING PROBLEM RESOLUTION TASK STATUS USING AWARENESS OF CURRENT STATE AND TRANSACTION HISTORY

BACKGROUND

Embodiments of the invention relate to resolving application or system problems. More specifically, the embodiments of the invention relate to synchronizing a transaction profile with an application status and external events to modify the problem resolution strategy.

DESCRIPTION OF THE RELATED ART

Businesses often manage an information technology (IT) infrastructure without the aid of a dedicated IT staff having detailed knowledge of the software and hardware solutions of the infrastructure. Often, individuals responsible for managing the IT infrastructure (IT-responsible people) are primarily business users, who may perform IT tasks only as a secondary job duty.

When an application experiences a problem, a user may rely on a static solution to solve the problem. However, the system may have undergone any number of changes after the problem occurred. Thus, static solutions may not account for these changes to the state of the system (or the state of other application programs running in the system). That is, some tasks specified by the static solution may no longer be relevant. In some cases, the user may have insufficient technical skills to assess the current system state. In other cases, information about the current system state may not be readily available, even to skilled users.

SUMMARY

One embodiment of the invention includes a method. The method may generally include configuring one or more computer processors of a system to perform an operation, and the operation itself may generally include identifying a problem experienced by an application executing on the system and retrieving a transaction profile associated with the problem. The transaction profile specifies a sequence of transactions to be performed on the system to resolve the problem. The operation may further include monitoring transactions occurring on the system. Upon detecting that a transaction occurring on the system matches one of the sequences of transactions of the transaction profile, the particular one of the sequence of transactions in the transaction profile may be marked as having been performed.

Another embodiment of the invention includes a computer-readable storage medium containing a program which, when executed, performs an operation. The operation itself may generally include identifying a problem experienced by an application executing on the system and retrieving a transaction profile associated with the problem. The transaction profile specifies a sequence of transactions to be performed on the system to resolve the problem. The operation may further include monitoring transactions occurring on the system. Upon detecting that a transaction occurring on the system matches one of the sequences of transactions of the transaction profile, the particular one of the sequence of transactions in the transaction profile may be marked as having been performed.

Still another embodiment of the invention includes a system having one or more computer processors and a memory containing a program, which when executed by the one or more computer processors is configured to perform an operation. The operation itself may generally include identifying a problem experienced by an application executing on the system and retrieving a transaction profile associated with the problem. The transaction profile specifies a sequence of transactions to be performed on the system to resolve the problem. The operation may further include monitoring transactions occurring on the system. Upon detecting that a transaction occurring on the system matches one of the sequences of transactions of the transaction profile, the particular one of the sequence of transactions in the transaction profile may be marked as having been performed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
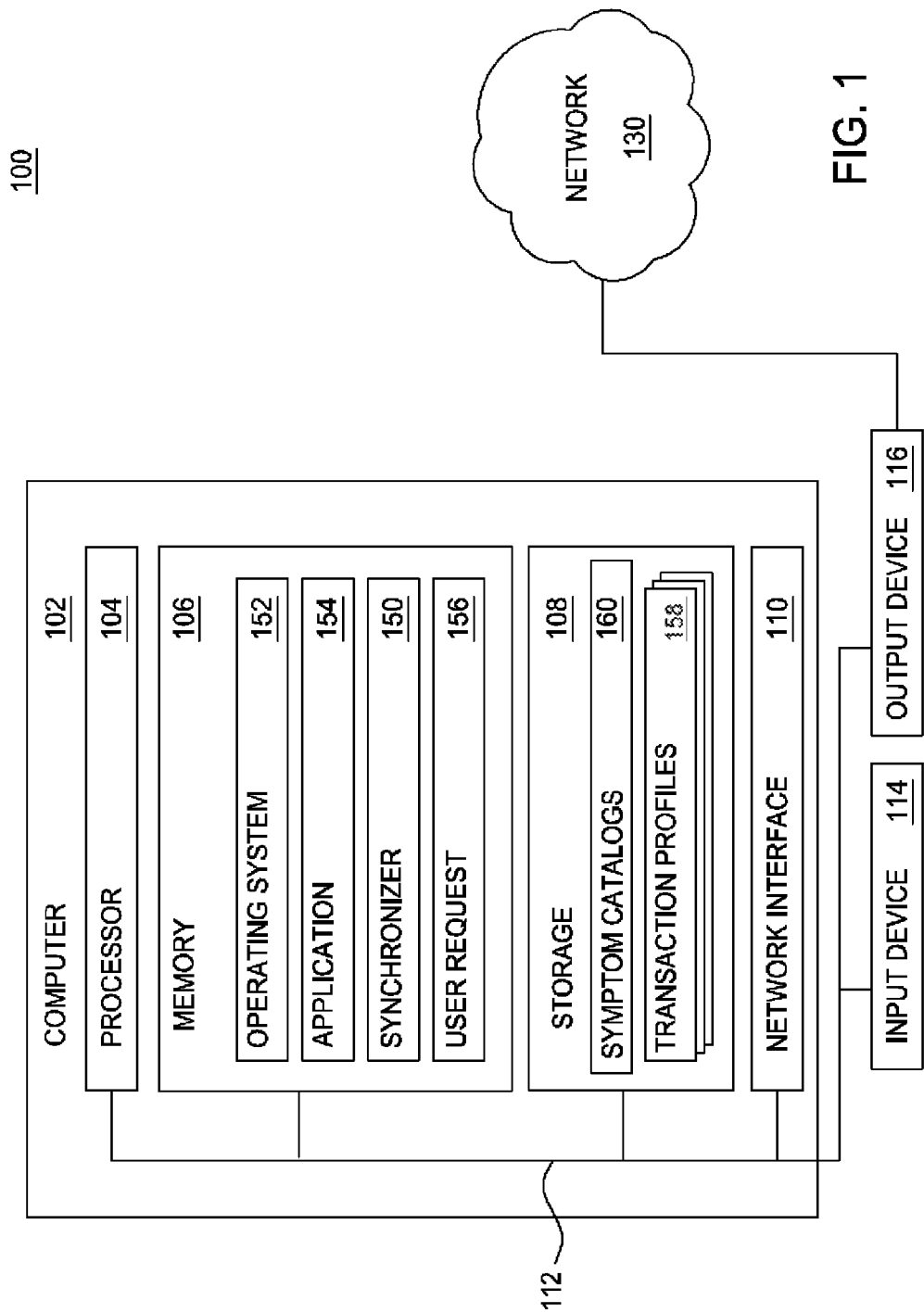
FIG. 1 is a block diagram illustrating a system for synchronizing a transaction profile with an application status, according to one embodiment of the invention.

Embodiments of the present invention provide techniques for synchronizing a transaction profile with a resolution status of a problem experienced by an application or system. Problems with services, such as networking and printers could also be synchronized with a transaction profile, for example. In one embodiment, a software application, referred to herein as a synchronizer, may create and/or retrieve a transaction profile describing a sequence of transactions to be performed on a computing system (or network of systems) executing the application to remedy the problem. Further, the synchronizer may monitor the system to detect any changes in the state of the system. Any detected change may be synchronized with the transaction profile. That is, the transaction profile may be synchronized with the resolution status of the problem. If a detected change corresponds to a transaction (of the sequence of transactions) the synchronizer may mark the transaction as "performed" in an instance of the transaction profile. For example, if the synchronizer detects that a database server application executing on the system is restarted, the synchronizer may mark a transaction step of "Restart the database server" as "performed" in the transaction profile.

In one embodiment, a user may define a problem via a symptom catalog. The symptom catalog may include rules specifying symptoms of the problem, a description of the business impact of the problem, and a set of solutions for resolving or mitigating the problem. Each solution may be represented by a transaction profile (i.e., as a sequence of steps for resolving a specific problem). Further, entries in the symptom catalog may be annotated with characteristics of the problem, such as whether the problem may be corrected by an external event, such as restarting the application or system.

As described in greater detail below, a variety of techniques may be used to synchronize a transaction profile. In one embodiment, the synchronizer may retrieve a transaction profile for a problem being experienced by an application (and/or by users of a computing system, or network of computing systems). For example, the transaction profile may be generated based on vendor documentation describing how to troubleshoot a particular application. Alternatively, the transaction profile may be generated by another user troubleshooting a previous occurrence of the problem. That is, "the synchronizer learns the steps described by the symptom definition by watching the transactions that are created as a result of the user executing those steps. In one embodiment, the transaction profile describes a set of transactions that are to take place and any order the transactions are to be performed in to solve the problem associated with that transaction profile.

Once a transaction profile exists for a problem, the synchronizer monitors transactions as they occur and compares them to transaction profiles of open problems. A match between a monitored transaction and a transaction profile, or a portion of the profile, of an open problem may signify that a resolution (or "fix") of the problem has partially (or completely) occurred. The synchronizer may notify a user that a partial (or complete) fix has occurred.

In one embodiment, the synchronizer may verify a resolution status of an open problem experienced by an application. A transaction profile may include verification scripts executed to determine whether a problem has been fixed. In one embodiment, the synchronizer periodically executes verification scripts for open problems to determine if the open problems have been fixed (i.e., to obtain an updated status of each open problem). Further, when a user investigates an open problem, the synchronizer may run one or more verification scripts to obtain information that reflects the current state of the system.

In one embodiment, the synchronizer may monitor system events. The synchronizer may also evaluate system events against symptom definitions of open problems. The synchronizer may close an open problem if the symptom definition is annotated to indicate that the occurrence of the event essentially resolves the problem.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 for synchronizing a transaction profile with an application status, according to one embodiment of the invention. Illustratively, networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes the operating system 152, an application 154, a synchronizer 150, and a user request 156. Further, the storage 108 of the computer 102 includes a symptom catalog 160, which includes transaction profiles 158. FIGS. 2 through 9 and associated descriptions detail the structure and operation of the synchronizer 150 running on the computer 102.

In one embodiment, each transaction profile 158 includes a sequence of transactions to perform to address a particular problem. Examples of a transaction include starting a service, restoring a file, and invoking a script (among others). The synchronizer 150 may log each transaction performed on the system. The user may manually specify a description of a problem (e.g., symptoms thereof that are detectable by the synchronizer), and the synchronizer 150 may record each transaction performed to resolve the problem. Alternatively, the synchronizer 150 may generate a transaction profile the first time a problem is fixed on the system (allowing it to be used to address subsequent instances of the problem). The set of transactions associated with the fix may be distinguished from other transactions via an ID value that is inserted into a transaction token, which in turn is passed from transaction to transaction until the solution is completed. That is, a marker may be used to identify what flows of transactions are related to one another as part of a transaction profile being performed.

When a problem occurs, the synchronizer 150 may monitor transactions for any matches to the transaction profile of any open problem. The synchronizer 150 may update a status of an open problem based on a match, to indicate that a transaction (i.e., a step of the solution) has been performed. In one embodiment, if a user has performed one or more steps of a transaction, the synchronizer 150 may notify the user that some of the steps required to resolve an open problem have been completed. The synchronizer 150 may further prompt the user to determine whether the user desires to complete the remaining steps specified in the transaction profile to the open problem. If all transactions in a transaction profile are complete, the synchronizer 150 may mark (or annotate) the associated open problem as resolved. Further, as described in greater detail below, the synchronizer may perform a verification step to confirm that a given problem has been, in fact, resolved by completed the transaction profile associated with that problem. The synchronizer 150 may then communicate an updated status of the problem to the user.

Further, the synchronizer 150 may be configured to monitor transactions to prevent a second user from initiating a transaction of a transaction profile if a first user is currently working with the transaction profile (e.g., using the transaction profile to solve an open problem). For example, if a solution to fix a web application involves running a configuration script and then restarting an application server, the synchronizer 150 may prevent the second user from restarting the application server prematurely (which may prevent one or more transactions of the first user from being successfully completed).

Figure 2:
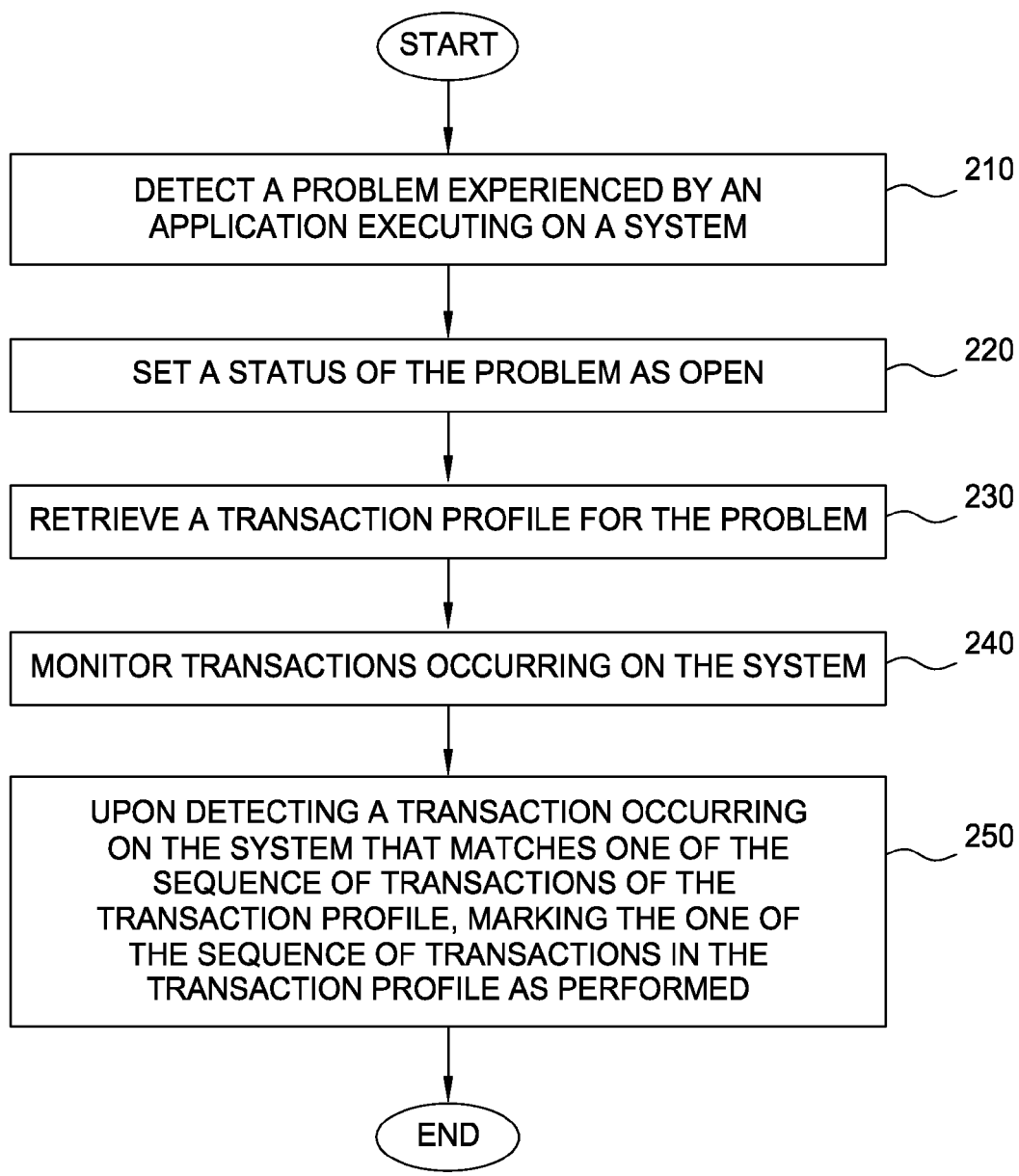
FIG. 2 is a flowchart depicting a method for synchronizing a transaction profile, according to one embodiment of the invention.

FIG. 2 is a flowchart depicting a method 200 for synchronizing a transaction profile 158, according to one embodiment of the invention. As shown, the method 200 begins at step 210, where the synchronizer 150 detects a problem experienced by an application 154 executing on the system. For example, the synchronizer 150 may detect a set of symptoms specified by the symptom catalog 160 for a specific problem. For instance, the synchronizer 150 may detect that a database server is not responding. At step 220, the synchronizer 150 sets a status of the problem as "open." At step 230, the synchronizer 150 identifies an appropriate transaction profile for the open problem of the application 154. For example, if a database server is not responding, an associated transaction profile (from the symptom catalog 160) may include the following sequence of steps:

TABLE I

Transaction profile example

| | |
|---|---|
| Profile ID: | 10001 |
| Problem: | Database server not responding |
| Solution: | 1. Run a specified configuration script |
| | 2. Restart the database server |

In this specific example, the transaction profile specifies that to solve the problem of the database server not responding, a user is to run a specified configuration script (e.g., to modify configuration settings of the database server) and to restart the database server. Note, following step 230, if the transaction profile does not exist for a given problem, it may be created the next time the user performs the steps to resolve the particular problem.

At step 240, the synchronizer 150 monitors transactions occurring on the system to update the status of problem resolution of the application 154. The application may execute on one or more computers of the networked system 100 (and may include operating systems). For example, the application 154 may be a database server application. The synchronizer 150 may monitor the database server application and detect any restart of the database server application. The synchronizer 150 may also monitor the operating system 152 running on the computer 102 to detect any restart of the operating system 152.

The portion of the synchronizer 150 that monitors an application may be referred to as a monitor, an agent, or a status detector (configured to monitor events from the application, such as events written to an event log). For example, a restart of the operating system 152 may indicate that the database server application 150 has also been restarted.

The synchronizer 150 may also monitor any related application. For example, application 154 may be part of a larger application stack. That is, businesses and organizations often require an assortment of software products to deliver a fully functional solution or service. This set of applications is frequently referred to as an application stack and may include a wide assortment of applications. These applications are often related, but are still separate and independent applications. The applications in an application stack interact with one another to provide a particular service to end users. For example, the application stack may include an Apache® web server, a WebSphere® Application Server, and a DB2® database server to support a web-based service or application. Further, the synchronizer 150 may also execute on other computers to monitor transactions on the other computers.

At step 250, upon detecting a transaction occurring on the system that matches one of the sequence of transactions of the transaction profile, the synchronizer 150 marks the one of the sequence of transactions in the transaction profile as "performed." In other words, the transaction profile 158 is synchronized with the detected status to produce a synchronized transaction profile. For example, the synchronizer 150 may generate a synchronized transaction profile based on the transaction profile 158 and the detected status. After the step 250, the method 200 terminates. Table II provides an example of a synchronized transaction profile.

TABLE II

Synchronized transaction profile example

| | |
|---|---|
| Profile ID: | 10001 |
| Problem: | Database server not responding |
| Solution: | 1. Run a specified configuration script - COMPLETED |
| | 2. Restart the database server |

In this specific example, the transaction "Run a specified configuration script" is marked as completed in the transaction profile. Thus, as illustrated in table II, the synchronizer 150 may update the transaction profile 158 based on the detected status. The transaction profile may also be marked to include a variety of properties pertaining to completion of a particular transaction of the transaction profile, e.g., date and time information of a completed transaction (e.g., Apr. 2, 2009 12:30 pm). For example, the properties may include information associated with the actor that performed the transaction (i.e., a user or an application). For example, if a user initiated the database server reboot, the transaction profile may be marked with information associated with the user (e.g., a login name, such as "BSMITH"). If an application initiated the database server reboot, the transaction profile may be marked with information about the initiating application (e.g., process name or ID).

Furthermore, a transaction profile 158 may include one or more dependencies between transactions. For example, a transaction profile 158 may specify that a first transaction (e.g., "Run a specified configuration script") is to be completed before a second transaction (e.g., "Restart the database server"). Accordingly, in one embodiment, the synchronizer 150 annotates a transaction with a "COMPLETED" status only if all earlier transactions have been completed before the later transaction was initiated.

Once the transaction profile 158 is synchronized, the synchronizer 150 may notify a user that each step in a transaction profile has been completed (e.g., "Restart the database server" of Profile ID 10001 has been completed for an open problem). For example, a user responsible for the application 154 may be notified through various ways, including email, RSS feeds, instant messaging, a popup window, a GUI of the synchronizer 158, etc.

Further, the synchronizer 150 may receive a request 156 (e.g., from a user responsible for the application 154) to perform a transaction in the transaction profile 158. Additionally, the synchronizer 150 may observe a particular user's transactions, and if they have completed some of the transactions required to fix a problem, notify the user they have taken some steps that partially resolve an open problem and ask if they want to complete the remaining steps. Similarly, if a user is actively working to complete the steps to resolve an open problem and another user requests to perform a transaction that is in the transaction profile, the second user may be notified that they should wait until the first user is finished so as not to disrupt the action the first user is trying to apply.

Figure 3:
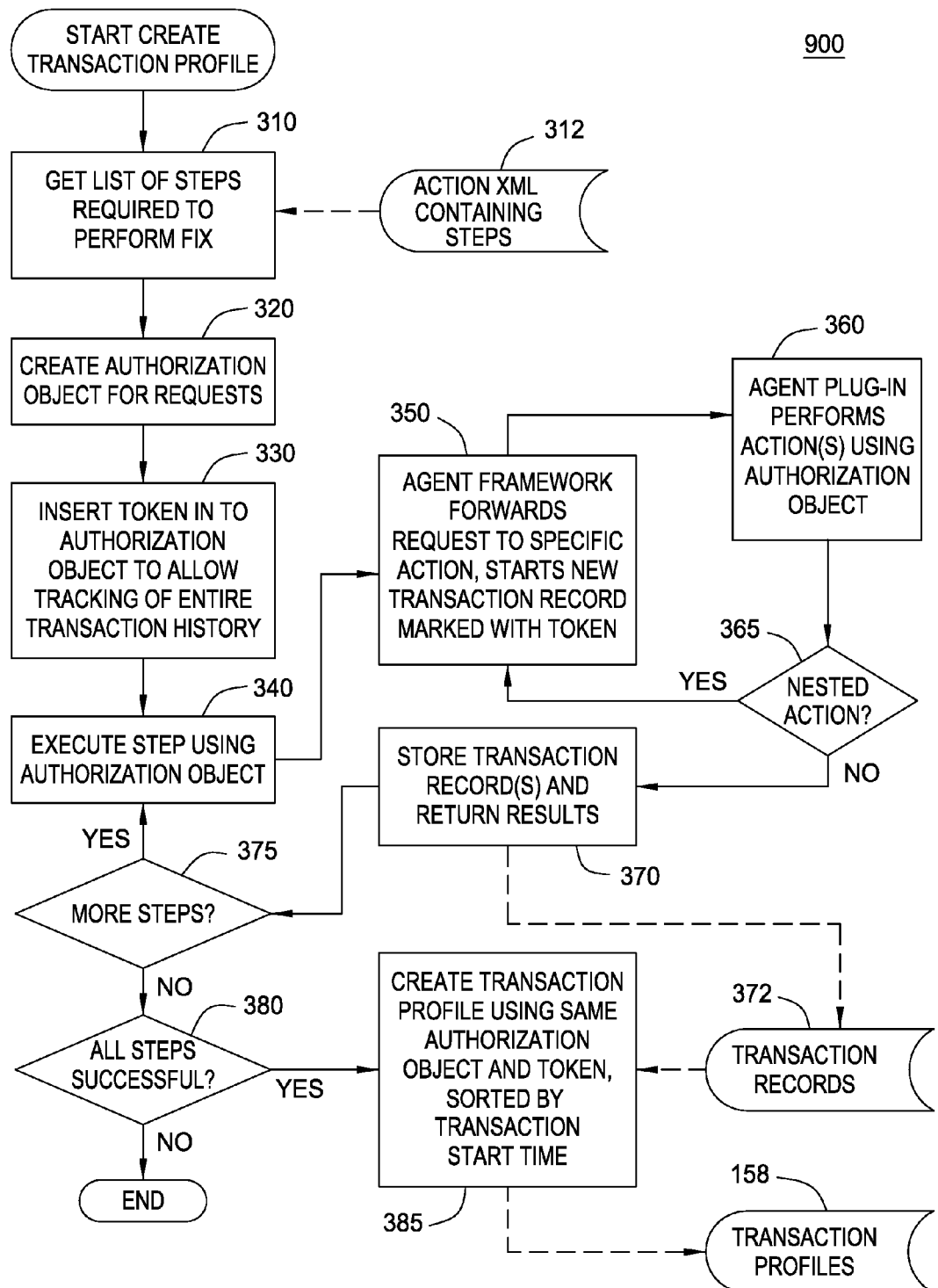
FIG. 3 is a flowchart depicting a method for creating a transaction profile, according to one embodiment of the invention.

FIG. 3 is a flowchart depicting a method 300 for creating a transaction profile 158, according to one embodiment of the invention. As shown, the method 300 begins at step 310, where the synchronizer 150 retrieves a list of transactions (also known as steps, or actions) performed in order to fix a specified perform. For example, an action file 312 which includes a list of steps may be received. The file itself may be composed using an Extensible Markup Language (XML) grammar. At step 320, the synchronizer 150 creates an object authorizing transactions to be performed. The object may be referred to herein as an "authorization object". At step 330, the synchronizer 150 supplies a token to the authorization object to allow an entire transaction history to be tracked.

At step 340, the synchronizer 150 begins executing a transaction using the authorization object. The transaction may include several actions to be performed. At step 350, the synchronizer 150 forwards a request to perform a single action using the authorization object. At step 360, a plug-in of the synchronizer performs an action. At step 365, the method 300 determines whether the current transaction includes a nested transaction. If so, the method returns to step 350. Otherwise, the method proceeds to step 370, where the synchronizer 150 stores one or more records of the transaction and returns results.

At step 375, the synchronizer 150 evaluates whether more transactions remain to be performed, according to one embodiment. If so, the method 300 returns to step 340. Otherwise, the method 300 proceeds to step 380, where the synchronizer 150 determines whether all transactions were successful. If so, the method 300 proceeds to step 385, where the synchronizer 150 creates a transaction profile 158 using the authorization object and token and sorted by a start time of each transaction of the list of transactions (e.g., based on the transaction records 372). After step 380 or step 385, the method 300 terminates.

Figure 4:
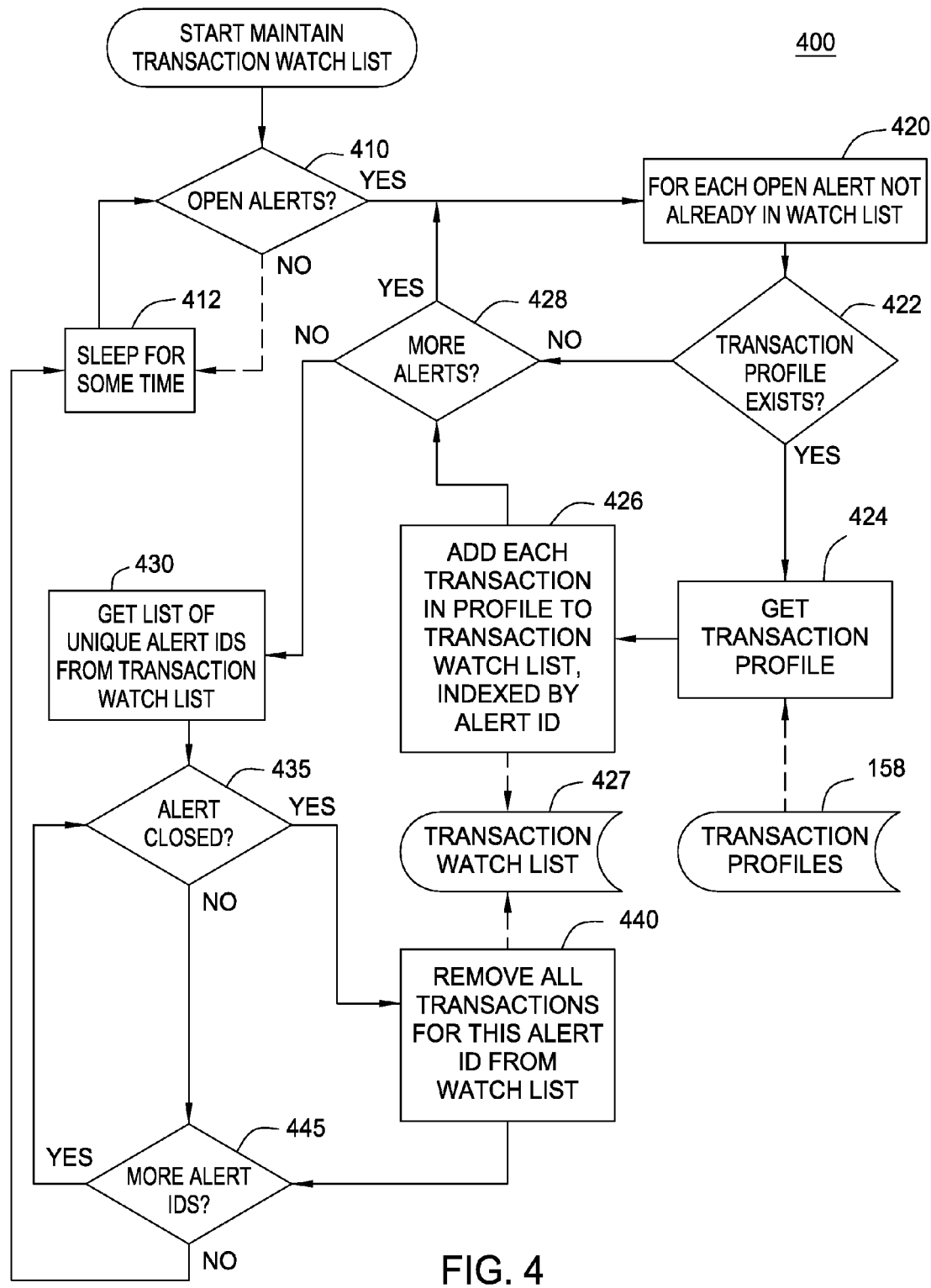
FIG. 4 is a flowchart depicting a method for creating and maintaining a list of transactions to monitor, according to one embodiment of the invention.

FIG. 4 is a flowchart depicting a method 400 for creating and maintaining a list of transactions to monitor, according to one embodiment of the invention. As noted above, the synchronizer 150 may monitor for the occurrence of transactions related to any open problem. As shown, the method 400 begins at step 410, where the synchronizer 150 evaluates whether there are any open problems (or alerts thereof). If not, the method 400 proceeds to step 412, where the synchronizer 150 sleeps for a predefined period of time. Otherwise, the method 400 proceeds to step 420, where the synchronizer 150 iterates over each open problem not already in a list of open problems for which transactions are to be monitored (also referred to herein as a "watch list"). In one embodiment, the watch list may also include, for each open problem on the system, all transactions yet to be performed for resolving the respective open problem. At step 422, the synchronizer 150 evaluates whether a transaction profile 158 exists for the respective open problem. If so, the method proceeds to step 424, where the synchronizer 150 retrieves the transaction profile 158. Further, at step 426, the synchronizer 150 adds each transaction in the transaction profile to the watch list 427 (e.g., indexed by a problem identifier). After step 426, or if a transaction 158 does not exist for the respective open problem, the method 400 proceeds to step 428.

At step 428, the synchronizer 150 evaluates whether more open problems remain that are not already in the watch list. If so, the method 400 returns to step 420. Otherwise, the method 400 proceeds to step 430, where the synchronizer 150 retrieves a list of problem identifiers from the transaction watch list 427. At step 435, the synchronizer 150 evaluates whether the open problem can be closed (e.g., due to a transaction occurring or because a user manually closed the problem). If so, the method 400 proceeds to step 440, where the synchronizer 150 removes all transactions for the given problem identifier from the watch list 427. After step 440, or if the open problem is not yet closed, the method proceeds to step 445, where the synchronizer 150 evaluates whether more problem identifiers remain in the transaction watch list 427. If so, the method 400 returns to step 435. Otherwise, the method 400 returns to step 412, where the synchronizer sleeps for a predefined period of time.

Figure 5:
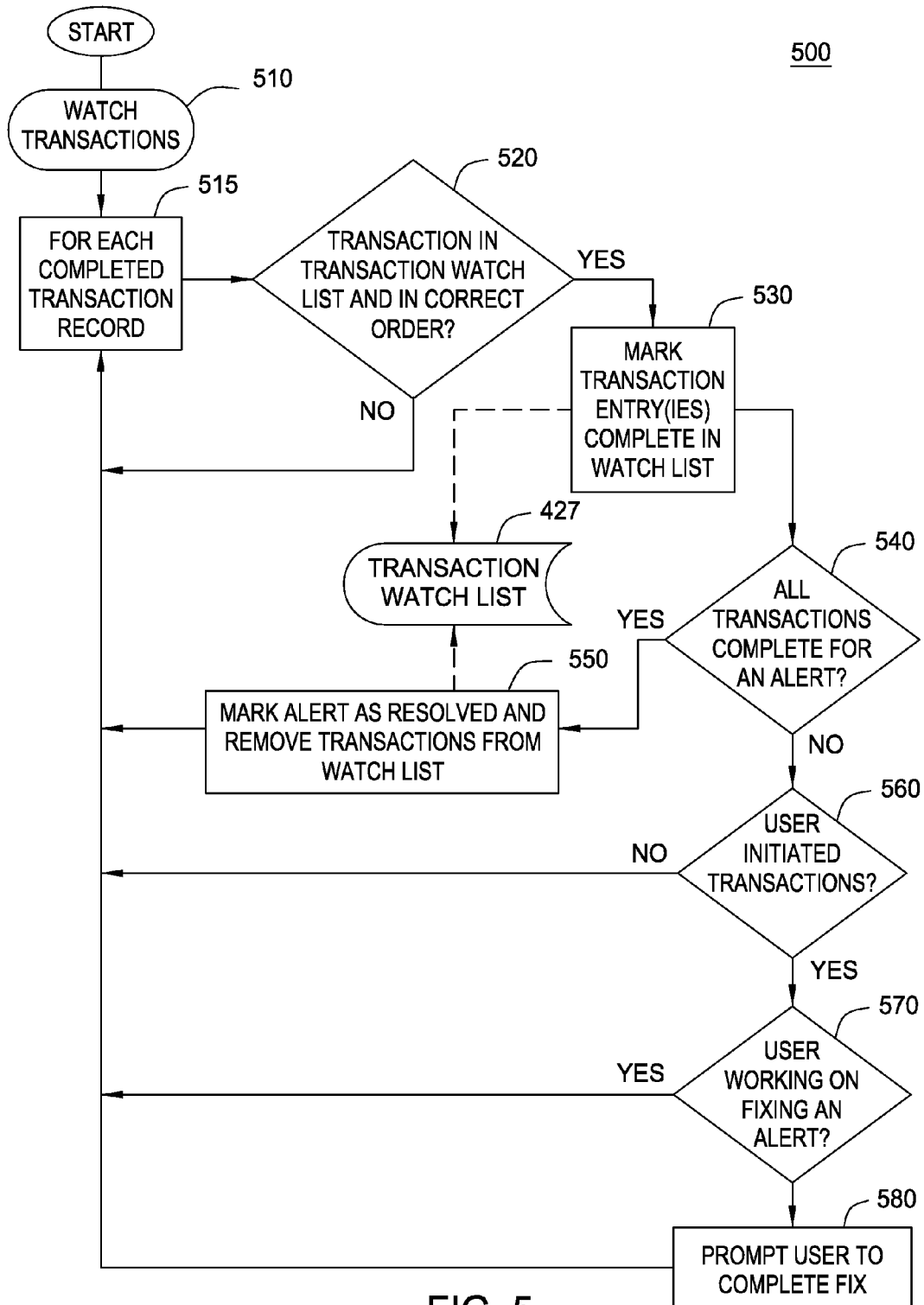
FIG. 5 is a flowchart depicting a method for synchronizing a transaction profile, according to one embodiment of the invention.

FIG. 5 is a flowchart depicting a method 500 for synchronizing a transaction profile 158, according to one embodiment of the invention. As shown, the method 500 begins at step 510, where the synchronizer 150 watches transactions in the watch list 427 of FIG. 4. At step 515, the synchronizer 150 iterates over each completed transaction record 372 of FIG. 3. At step 520, the synchronizer 150 evaluates whether the respective transaction is in the watch list 427 and was performed in a correct order. If so, the method 500 proceeds to step 530, where the synchronizer 150 marks one or more transaction entries as "COMPLETE" in the watch list 427. Otherwise, the method 500 returns to step 515, where the synchronizer 150 iterates over the next completed transaction record 372.

At step 540, the synchronizer 150 evaluates whether each transactions specified by a transaction profile being performed for an open problem have, in fact, been performed. If so, the synchronizer 150 marks the open problem as closed (or resolved) and removes the open problem from the watch list 427. After step 550, the method returns to step 515, where the synchronizer 150 iterates over the next completed transaction record 372.

At step 540, the synchronizer 150 determines whether all of the transactions are complete for an open problem. If not, the synchronizer determines whether the respective transaction was initiated by a user (step 560). If so, the synchronizer 150 determines if the user that initiated the transaction is currently working on the fix for the open alert (step 570). If so, method 500 returns to step 515 to process a next completed transaction record 372. If the user is not currently fixing an open problem, the synchronizer prompts the user to complete remaining transactions for a transaction profile at step 580 (i.e., to complete a step needed to resolve an open problem). After step 580, the method 500 returns to step 515, where the synchronizer 150 iterates over the next completed transaction record 372.

In one embodiment, the synchronizer 150 may verify that performing a given transaction profile in fact, resolved the open problem. For example a transaction profile may have corresponding entries in the symptom catalog 160 that include one or more verification steps. In such cases, the synchronizer 150 may periodically perform the verification steps for open problems. The period may be defined via a configuration parameter (e.g. hourly, daily, etc.). An example of a verification step is a script that ensures a service is running or that network connectivity has been restored (e.g., via pinging an external server).

In one embodiment, when a user investigates a problem (e.g., via a GUI) that includes one or more verification steps, the synchronizer 150 may perform the verification before presenting any solution to the user (i.e., to ensure that the current state of the system warrants any of the action prescribed by the solution).

Figure 6:
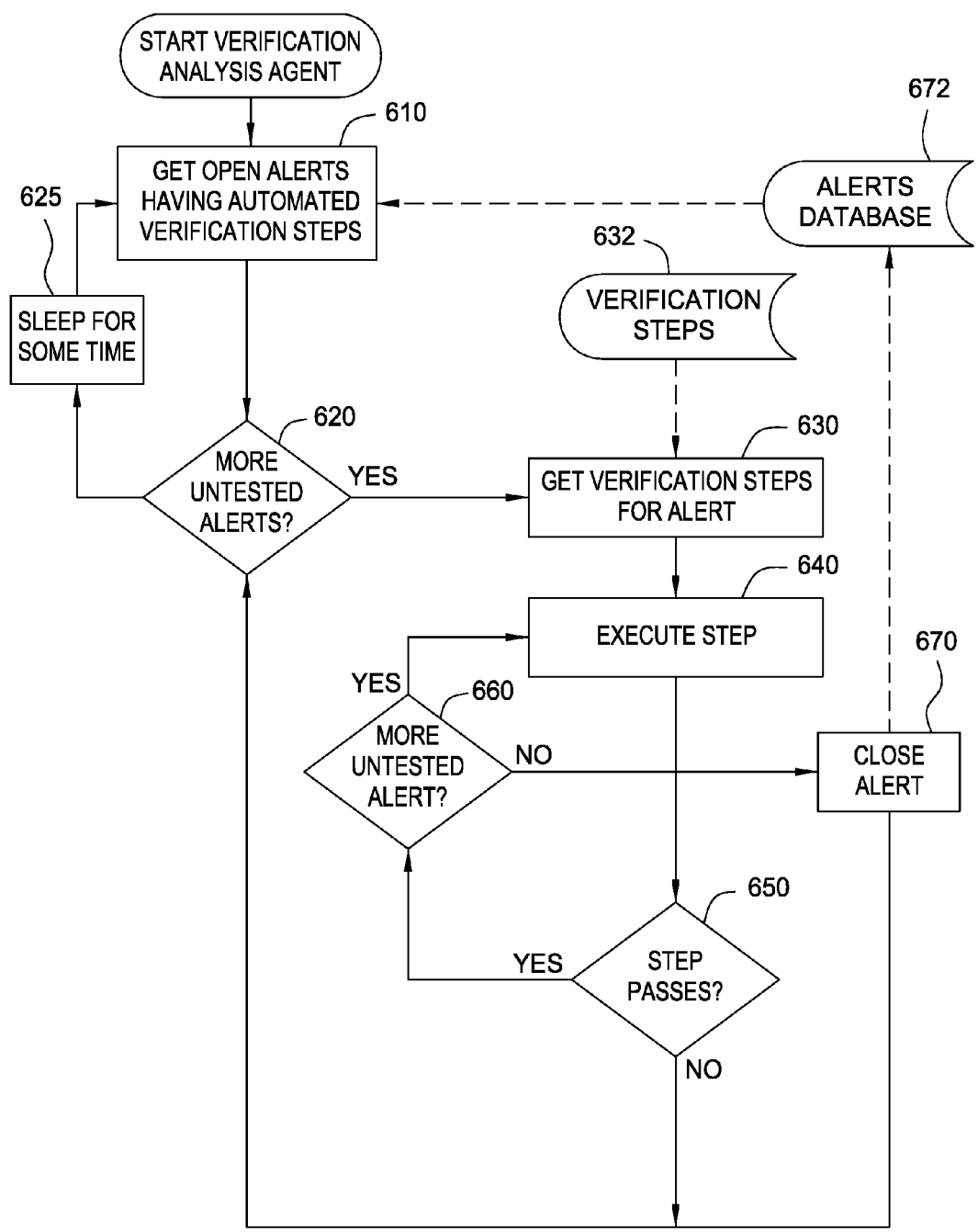
FIG. 6 is a flowchart depicting a method for verifying a resolution status of a problem, according to one embodiment of the invention.

FIG. 6 is a flowchart depicting a method 600 for performing an automated verification analysis, according to one embodiment of the invention. As shown, the method 600 begins at step 610, where the synchronizer 150 identifies open problems having automated verification steps (e.g., from an open problem/alerts database 672). At step 620, the synchronizer 150 evaluates whether more open problems remain to be verified. If not, the method 600 proceeds to step 625, where the synchronizer 150 sleeps for a predefined period of time. Otherwise, the method 600 proceeds to step 630, where the synchronizer 150 retrieves one or more verification steps 632 for an open problem.

At step 640, the synchronizer 150 executes one of the verification steps 632. At step 650, the synchronizer 150 evaluates whether the verification step 632 was performed successfully. If not, the method 600 returns to step 620. Otherwise, at step 660, the synchronizer 150 evaluates whether more verification steps 660 remain. If so, the method 600 returns to step 640. Otherwise, all verification steps have passed for the open problem and at step 670 the synchronizer 150 closes the open problem. For example, the synchronizer may update the open problem/alert database 672. The method 600 then returns to step 620, where the synchronizer 150 evaluates whether more open problems remain to be verified.

Figure 7:
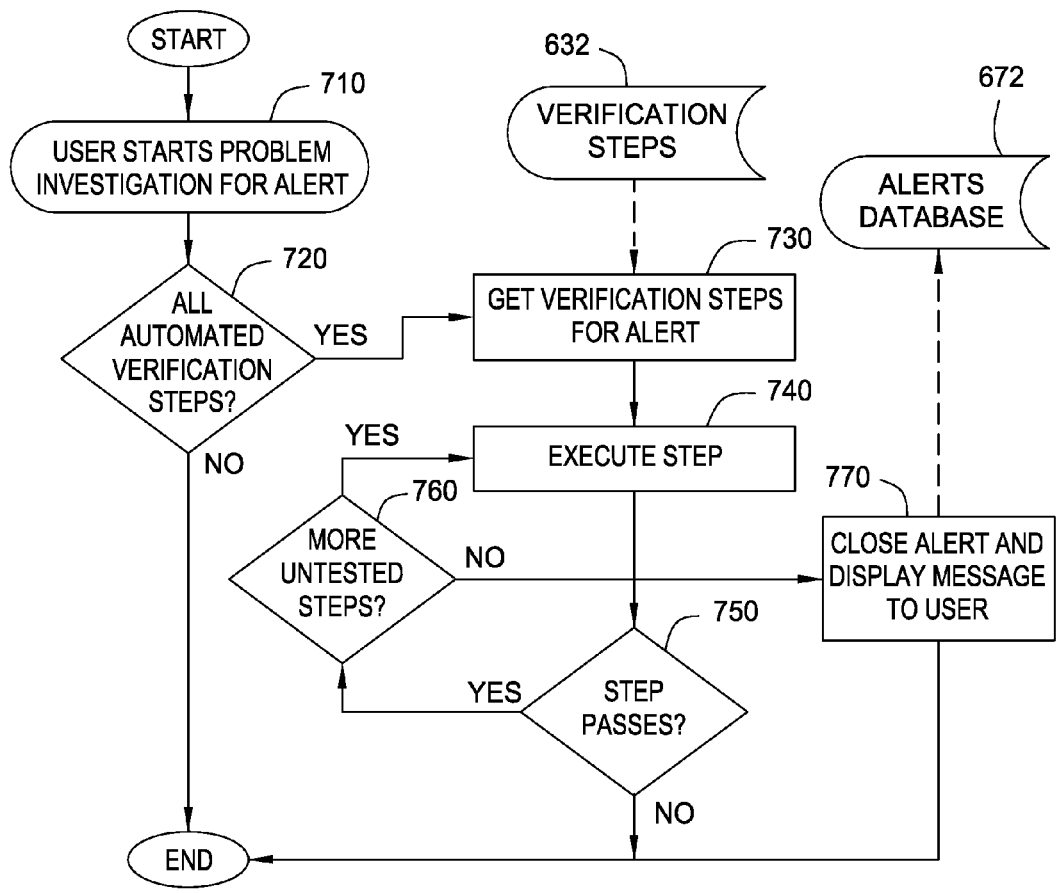
FIG. 7 is a flowchart depicting a method for interactively verifying a resolution status of a problem, according to one embodiment of the invention.

FIG. 7 is a flowchart depicting a method 700 for performing interactive verification analysis, according to one embodiment of the invention. As shown, the method 700 begins at step 710, where a user initiates an investigation of an open problem (e.g., in response to being notified of the open problem). At step 720, a check is performed to identify whether this open problem has a set of verification steps that may all be performed automatically. If not, the method 700 terminates. Otherwise, at step 730 the synchronizer 150 retrieves one or more verification steps 632 for the open problem.

At step 740, the synchronizer 150 executes one of the verification steps 632. At step 750, the synchronizer 150 evaluates whether the verification step 632 was performed successfully. If not, the method 700 terminates. Otherwise, then at step 760 the synchronizer 150 evaluates whether more verification steps 660 remain. If so, the method 700 returns to step 740. Otherwise, after all verification steps have passed for the open problem, the synchronizer 150 closes the open problem and notifies the user accordingly (step 770).

In one embodiment, the synchronizer 150 may monitor system events to detect any system event that matches a transaction of a transaction profile for an open problem. System events include observable events (e.g., a system reboot) that may change the status of one or more open problems. For example, a problem related to a memory or resource leak may in some cases be resolved by rebooting an affected system. In one embodiment, the symptom catalog 160 includes annotations specifying whether a problem is to be considered resolved when a set of observable system events occurs. For example, a transaction profile for an unresponsive application may be completed if the application is restarted. A system boot may also resolve the problem for applications that are automatically started at system boot. System analysis is further described below in conjunction with FIG. 8.

Figure 8:
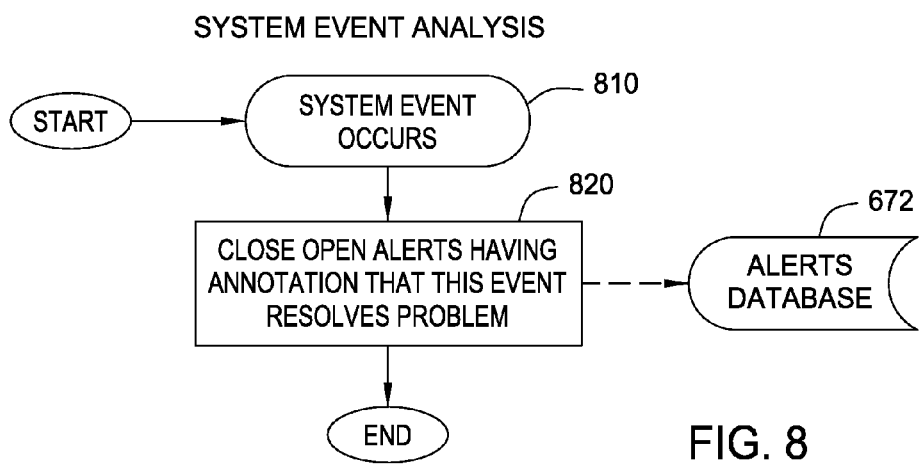
FIG. 8 is a flowchart depicting a method for monitoring system events, according to one embodiment of the invention.

FIG. 8 is a flowchart depicting a method 800 for performing system event analysis, according to one embodiment of the invention. As shown, the method 800 begins at step 810, where a system event occurs. At step 820, the synchronizer 150 closes only those open problems that specify that the system event corrects the respective open problem (e.g., via updating the open problem/alerts database 672). After step 820, the method 800 terminates.

Figure 9:
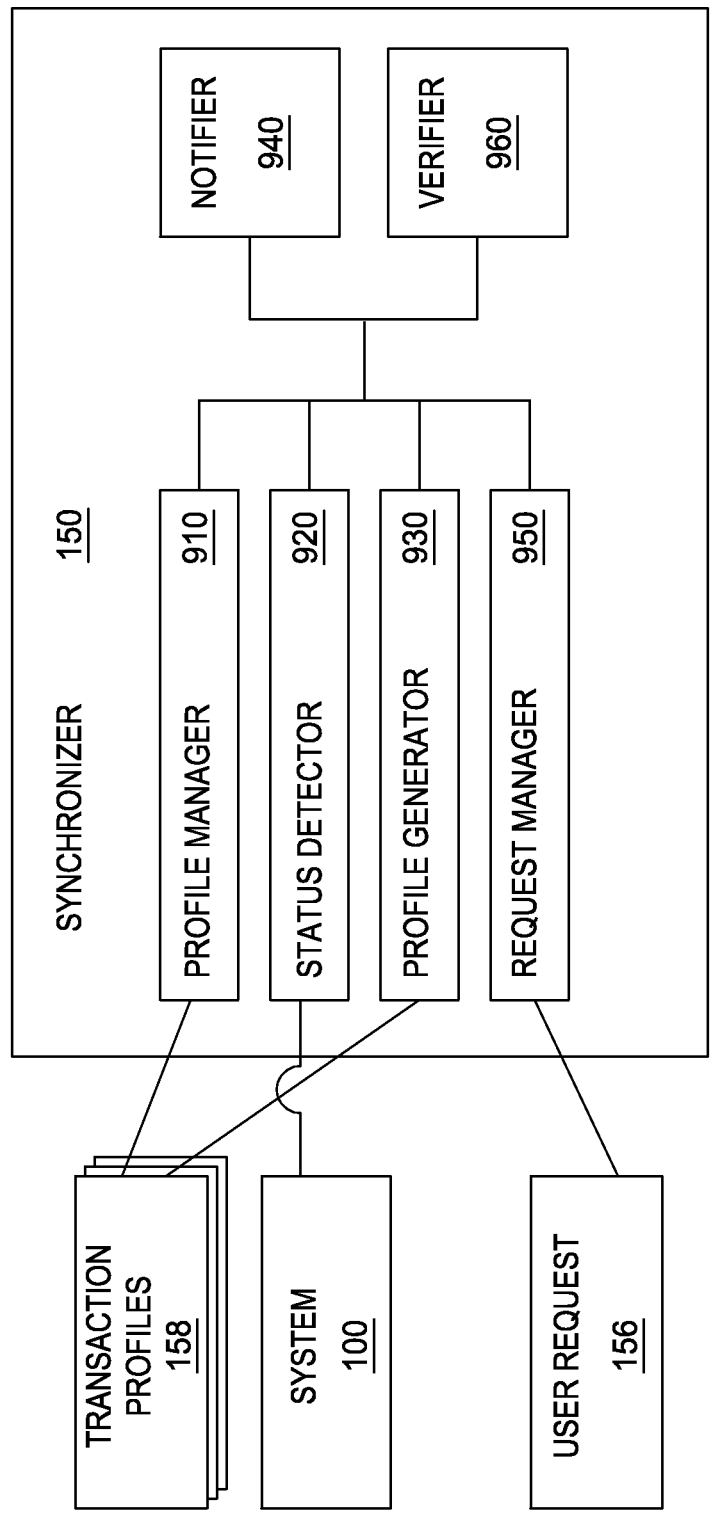
FIG. 9 is a block diagram illustrating components of a synchronizer, according to one embodiment of the invention.

FIG. 9 is a block diagram 900 illustrating components of the synchronizer 150 of FIG. 1, according to one embodiment of the invention. As shown, the synchronizer 150 includes a profile manager 910, a status detector 920, a profile generator 930, a notifier 940, a request manager 950, and a verifier 960.

In one embodiment, the profile manager 910 retrieves a transaction profile 158 for a detected problem of an application executing on the system. For example, the profile manager 910 may receive a transaction profile for troubleshooting a database server problem (e.g., the transaction profile of Table I). The status detector 920 detects a problem resolution status of an application executing on the system 100, according to one embodiment. For example, the status detector 920 may detect that the database server has been restarted. The profile generator 930 creates a synchronized transaction profile based on the transaction profile 158 and the detected status, according to one embodiment. For example, the profile generator 930 may create an updated transaction profile for troubleshooting a database server problem, the updated transaction profile reflecting that the database server has already been restarted (e.g., the updated transaction profile of Table II).

In one embodiment, a user may be notified of the synchronized transaction profile. For example, the notifier 940 may email a user responsible for the database server of the updated transaction profile for troubleshooting the database server problem, the updated transaction profile reflecting that the database server has already been restarted (e.g., the updated transaction profile of Table II). Other ways of notifying a user are broadly contemplated. For example, the notifier 940 may also write to a log file for which the user has access.

In one embodiment, the request manager 950 receives a user request 156. For example, a user (who may or may not have be aware that the database server has already been restarted) may request to restart the database server (or perform some action relevant to the actions of another user working through the steps of a transaction profile. That is, one user may be prevented from interrupting a user who is in the process of applying a fix by prematurely executing one of the transactions in the profile. Now, for the first user, when they go to execute the transaction profile to fix a problem, if the first two steps had already been performed, the first user could start with the third step rather than have them perform the first two again. Accordingly, the verifier 960 may be configured to evaluate the user request 156 and the synchronized transaction profile to determine whether the requested transaction should to be performed, according to one embodiment.

Of course, the embodiments described herein are intended to be illustrative and not limiting of the invention, and other embodiments are broadly contemplated. Those skilled in the art will recognize, for example, that embodiments of the invention may be adapted to support other transaction profiles, statuses, and user requests.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention synchronize a transaction profile with a resolution status for a problem experienced by an application running on the system. In one embodiment, a synchronizer may learn about the problem by looking at a database of open alerts occurring in the application. The synchronizer may retrieve a transaction profile for a given problem. The transaction profile may include a sequence of transactions to be performed on the system to remedy the detected problem. The synchronizer may monitor transactions occurring on the system and update an instance of the transaction profile for the detected problem accordingly to create a synchronized transaction profile. Further, the synchronizer may notify a user about the synchronized transaction profile (e.g., via an alert). The alert may be dynamic (i.e., may reflect a current system health). The synchronizer may also receive a user request to perform a transaction and help prevent two users from performing conflicting (or redundant) actions. The synchronizer may determine what remaining transactions are to be performed to fix an open problem.

While the foregoing is directed to embodiments of the present invention, other and further embodiments of the invention may be devised without departing from the basic scope thereof, and the scope thereof is determined by the claims that follow.

What is claimed is:

1. A computer-implemented method to manage transaction states to facilitate avoidance of repeated transactions when resolving system problems, the computer-implemented method comprising:
    configuring one or more computer processors of a system to perform an operation comprising:
        identifying a first instance of a problem experienced by an application executing on the system;
        responsive to identifying the first instance of the problem, creating a transaction profile associated with the problem, wherein the transaction profile specifies a sequence of transactions that are performed on the system to resolve the problem, wherein the transaction profile is associated with a transaction token comprising an identification (ID) value;
        identifying a second instance of the problem experienced by the application executing on the system;
        responsive to identifying the second instance of the problem:
            detecting a first transaction performed on the system, wherein the first transaction is associated with the transaction token;
            upon determining the first transaction matches one of the sequence of transactions of the transaction profile, marking the one of the sequence of transactions in the transaction profile as having been performed;
            conveying that the first transaction, of the sequence of transactions, has been performed;
            passing the transaction token to a second transaction, of the sequence of transactions; and
            causing the system to perform the remainder of the sequence of transactions.

2. The computer-implemented method of claim 1, wherein the transaction token is passed to each transaction of the sequence of transactions,
    wherein creating the transaction profile comprises monitoring a set of transactions performed on the system responsive to identifying the first instance of the problem, wherein the monitoring includes:
        (i) logging a user-initiated transaction performed on the system;
        (ii) monitoring for an event of the system;
        (iii) monitoring for an event of the application;
        (iv) monitoring for an event of another application executing on the system; and
        (v) running a verification script to determine a status of the application and the another application.

3. The computer-implemented method of claim 2, wherein a symptom catalog for the problem comprises: (i) a set of symptoms of the problem, (ii) a description of a business impact of the problem, (iii) a set of solutions for resolving the problem, and (iv) a set of annotations describing characteristics of the problem, wherein, when monitoring the set of transactions monitors for an event of another application, the application and the another application execute in a single application stack on the system.

4. The computer-implemented method of claim 3, wherein the operation further comprises:
    upon determining that the marked one of the sequence of transactions completes the sequence of transactions to be performed on the system to remedy the problem, setting the status of the problem as closed.

5. The computer-implemented method of claim 4, wherein the transaction is marked by a transaction application, wherein the transaction application comprises:
    a profile manager configured to create the transaction profile associated with the problem responsive to identifying the first instance of the problem;
    a list of problem identifiers identifying the first and second instances of the problem experienced by the application executing on the system;
    a profile generator configured to mark the transaction in the transaction profile as having been performed;
    a request manager configured to receive a user request to perform the remainder of the sequence of transactions;
    a notifier configured to convey that the first transaction, of the sequence of transactions, has been performed; and
    a verifier configured to evaluate the user request to determine whether the requested remainder of the sequence of transactions, when performed, are performed successfully.

6. The computer-implemented method of claim 5, wherein the first transaction is initiated by a first user of the system, wherein the remainder of the sequence of transactions is only first performed responsive to receiving input.

7. The computer-implemented method of claim 6, wherein the operation further comprises:
    receiving a request from a second user to perform a one of the sequence of transactions on the system; and
    upon determining that the first user initiated the first transaction, blocking performance the transaction specified in the request received from the second user.

8. A non-transitory computer-readable storage medium containing a program which, when executed, performs an operation to manage transaction states to facilitate avoidance of repeated transactions when resolving system problems, the operation comprising:

identifying a first instance of a problem experienced by an application executing on the system;

creating a transaction profile associated with the problem, wherein the transaction profile specifies a sequence of transactions that are performed on the system to resolve the problem, wherein the transaction profile is associated with a transaction token comprising an identification (ID) value;

identifying a second instance of the problem experienced by the application executing on the system;

responsive to identifying the second instance of the problem:

detecting a first transaction performed on the system, wherein the first transaction is associated with the transaction token;

upon determining the first transaction matches one of the sequence of transactions of the transaction profile, marking the one of the sequence of transactions in the transaction profile as having been performed;

conveying that the first transaction, of the sequence of transactions, has been performed;

passing the transaction token to a second transaction, of the sequence of transactions; and causing the system to perform the remainder of the sequence of transactions.

9. The non-transitory computer-readable storage medium of claim 8, wherein the transaction token is passed to each transaction of the sequence of transactions, wherein creating the transaction profile comprises monitoring a set of transactions performed on the system responsive to identifying the first instance of the problem, wherein the monitoring includes:

(i) logging a user-initiated transaction performed on the system;

(ii) monitoring for an event of the system;

(iii) monitoring for an event of the application;

(iv) monitoring for an event of another application executing on the system; and (v) running a verification script to determine a status of the application and the another application.

10. The non-transitory computer-readable storage medium of claim 9, wherein a symptom catalog for the problem comprises: (i) a set of symptoms of the problem, (ii) a description of a business impact of the problem, (iii) a set of solutions for resolving the problem, and (iv) a set of annotations describing characteristics of the problem, wherein, when monitoring the set of transactions monitors for an event of another application, the application and the another application execute in a single application stack on the system.

11. The non-transitory computer-readable storage medium of claim 10, wherein the operation further comprises:

upon determining that the marked one of the sequence of transactions completes the sequence of transactions to be performed on the system to remedy the problem, setting the status of the problem as closed.

12. The computer-readable storage medium of claim 11, wherein the transaction is marked by a transaction application, wherein the transaction application comprises:

a profile manager configured to create the transaction profile associated with the problem responsive to identifying the first instance of the problem;

a list of problem identifiers identifying the first and second instances of the problem experienced by the application executing on the system;

a profile generator configured to mark the transaction in the transaction profile as having been performed;

a request manager configured to receive a user request to perform the remainder of the sequence of transactions;

a notifier configured to convey that the first transaction, of the sequence of transactions, has been performed; and a verifier configured to evaluate the user request to determine whether the requested remainder of the sequence of transactions, when performed, are performed successfully.

13. The non-transitory computer-readable storage medium of claim 12, wherein the first transaction is initiated by a first user of the system, wherein the remainder of the sequence of transactions is only first performed responsive to receiving input.

14. The non-transitory computer-readable storage medium of claim 13, wherein the operation further comprises:

receiving a request from a second user to perform a one of the sequence of transactions on the system; and upon determining that the first user initiated the first transaction, blocking performance the transaction specified in the request received from the second user.

15. A system, comprising:

one or more computer processors; and a memory containing a program, which when executed by the one or more computer processors is configured to perform an operation to manage transaction states to facilitate avoidance of repeated transactions when resolving system problems, the operation comprising:

identifying a first instance of a problem experienced by an application executing on the system;

creating a transaction profile associated with the problem, wherein the transaction profile specifies a sequence of transactions that are performed on the system to resolve the problem, wherein the transaction profile is associated with a transaction token comprising an identification (ID) value;

identifying a second instance of the problem experienced by the application executing on the system;

responsive to identifying the second instance of the problem:

detecting a first transaction performed on the system, wherein the first transaction is associated with the transaction token;

upon determining the first transaction matches one of the sequence of transactions of the transaction profile, marking the one of the sequence of transactions in the transaction profile as having been performed;

conveying that the first transaction, of the sequence of transactions, has been performed;

passing the transaction token to a second transaction, of the sequence of transactions; and causing the system to perform the remainder of the sequence of transactions.

16. The system of claim 15, wherein the operation further comprises:

monitoring the transactions performed on the system, wherein the transaction token is passed to each transaction of the sequence of transactions, wherein creating the transaction profile comprises monitoring a set of transactions performed on the system responsive to identifying the first instance of the problem, wherein the monitoring includes:

(i) logging a user-initiated transaction performed on the system;

(ii) monitoring for an event of the system;

(iii) monitoring for an event of the application;
(iv) monitoring for an event of another application executing on the system; and
(v) running a verification script to determine a status of the application and the another application.

17. The system of claim 16, wherein, wherein a symptom catalog for the problem comprises: (i) a set of symptoms of the problem, (ii) a description of a business impact of the problem, (iii) a set of solutions for resolving the problem, and (iv) a set of annotations describing characteristics of the problem, wherein, when monitoring the set of transactions monitors for an event of another application, the application and the another application execute in a single application stack on the system.

18. The system of claim 17, wherein the operation further comprises:
upon determining that the sequence of transactions completes the sequence of transactions to be performed on the system to remedy the problem, setting the status of the problem as closed.

19. The system of claim 18, wherein the transaction is marked by a transaction application, wherein the transaction application comprises:
a profile manager configured to create the transaction profile associated with the problem responsive to identifying the first instance of the problem;
a list of problem identifiers identifying the first and second instances of the problem experienced by the application executing on the system;
a profile generator configured to mark the transaction in the transaction profile as having been performed;
a request manager configured to receive a user request to perform the remainder of the sequence of transactions;
a notifier configured to convey that the first transaction, of the sequence of transactions, has been performed; and
a verifier configured to evaluate the user request to determine whether the requested remainder of the sequence of transactions, when performed, are performed successfully.

20. The system of claim 19, method of claim 5, wherein the first transaction is initiated by a first user of the system, wherein the remainder of the sequence of transactions is only first performed responsive to receiving the input.

21. The system of claim 20, wherein the operation further comprises:
receiving a request from a second user to perform a one of the sequence of transactions on the system; and
upon determining that the first user initiated the first transaction, blocking performance the transaction specified in the request received from the second user.

* * * * *